MEMORY SYSTEMS

Filed Dec. 31, 1956

INVENTORS.
Vernon L. Newhouse & William L. McMillan
BY Morris Rabkin
ATTORNEY.

INVENTORS.
Vernon L. Newhouse &
William L. McMillan
BY
Morris Rabkin
ATTORNEY.

INVENTORS.
Vernon L. Newhouse & William L. McMillan
BY Morris B. Pabkin
ATTORNEY.

3,049,695

MEMORY SYSTEMS

Vernon L. Newhouse, Haddonfield, and William L. McMillan, Little Rock, N.J., assignors to Radio Corporation of America, a corporation of Delaware Filed Dec. 31, 1956, Ser. No. 631,797
9 Claims. (Cl. 340—174)

This invention relates to electrical circuits, and particularly to electrical circuits using magnetic elements.

Magnetic elements of rectangular hysteresis loop material are extensively used in present-day electrical circuits. Examples of such use include magnetic amplifying, magnetic storage, and magnetic switching circuits. In certain prior circuits, the state of the element is determined only by applying a magnetizing force of sufficient intensity to change an element from one to another of its two remanent states.

It is an object of the present invention to provide circuits for such elements wherein a plurality of successive outputs can be obtained to indicate the state of the element without changing the remanent state of the element.

Another object of the present invention is to provide improved circuits for determining the state of such an element which circuits can be operated at faster speeds than other circuits heretofore known.

Still another object of the present invention is to provide improved circuits wherein a plurality of successive useful outputs can be obtained depending on the state of an element and without changing the state of the element, which circuits are simpler to operate and more economical to manufacture than certain prior circuits.

A further object of the present invention is to provide improved circuits for obtaining a signal depending on the state of the element and without changing the state of the element, whether one state or another, which circuits provide successive useful outputs without requiring any special core geometry.

In each of the illustrative circuits, according to the present invention, successive useful outputs are produced by applying a succession of relatively intense magnetizing forces, each of a relatively short duration, to a magnetic element. The amplitudes of the outputs produced on a winding linked to the element are dependent upon the remanent state of the element when the intense magnetizing forces are applied. In one state, relatively large amplitude outputs are produced and, in the other state, relatively small amplitude outputs are produced.

Furthermore, outputs of different amplitudes can be produced selectively by establishing the element in a desired state. The intense magnetizing force is larger than the coercive force for the element, and is preferably many times larger. The change of state of the element is reversible because of the short duration of the intense force and the rectangular hysteresis characteristic of the element, as described more fully hereinafter.

The invention is based on, and takes practical advantage of, two observations. The first observation is that, when a magnetizing force in excess of the coercive force is applied to a magnetic element of rectangular hysteresis characteristic in a direction to change the remanent state of the element, the force produces only a reversible magnetic change in the material provided that the force is applied for a sufficiently short time and provided that the force does not exceed a critical amplitude. The second observation is that the output of an element of such a characteristic is different, when the element is in one remanent state, from the output when the element is in the other remanent state on application of such a force.

Figure 1:
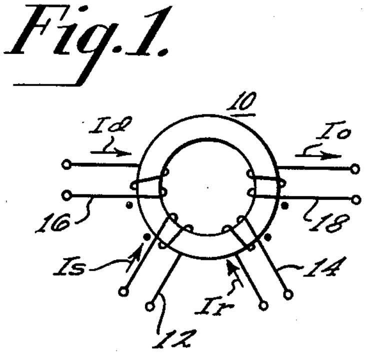
FIG. 1 is a schematic diagram of a system including a magnetic element and winding means thereon for producing desired outputs.

The element 10 of FIG. 1 is a toroidal core of substantially rectangular hysteresis loop material. Certain magnetic materials, such as 4–79 Molybdenum-Permalloy, exhibit the desired rectangular characteristics.

Figure 2:
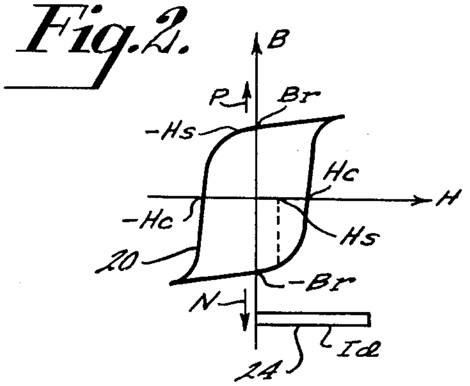
FIG. 2 is a graph of a hysteresis characteristic useful in explaining the operation of the system of FIG. 1.

A setting winding 12, a reset winding 14, an interrogation winding 16, and an output winding 18 are each linked to a core 10. The curve 20 of FIG. 2 is a graph of the hysteresis characteristic for the core 10. As seen in the graph of FIG. 2, the core 10 has two remanent states of magnetism arbitrarily designated as "P" (positive) and "N" (negative). The core 10 is changed from the state N to the state P by applying a magnetizing force (abbreviated herein as M.M.F.) in excess of the coercive force $Hc$ for a suitable time interval, and is changed from the state P to the state N by applying an opposite-polarity M.M.F. in excess of the coercive force $-Hc$. For typical metallic cores, such as 4–79 Molybdenum-Permalloy tape ⅛ milli-inches thick, the state of the core can be changed by applying an M.M.F. equal to twice the coercive force for approximately two microseconds. In general, the time required to change the core from one state to the other is inversely proportional to the amplitude of the applied M.M.F.

The convention adopted therein is that the state N corresponds to the set condition, and the state P corresponds to the reset condition. The core 10 is placed in its set condition by applying a setting current $Is$ to the setting winding 12. The core 10 is changed to the state P by applying a reset current $Ir$ to the unmarked terminal of the reset winding 14.

The sense in which the winding links the core 10, and each of the other cores hereinafter described, is indicated by the conventional transformer "dot" notation. In considering an input winding, conventional current flowing into the dot-marked terminal is in a direction to change the core to the N state. Current flowing into the unmarked terminal of an input winding is in a direction to change the core to the P state.

The interrogation signals $Id$ are applied to the drive winding 16 in the direction to change the core from the N to the P state. An interrogation pulse $Id$ is indicated in FIG. 2 by the pulse 24 beneath the curve 20 of FIG. 2. Note that the interrogation pulse 24 is of relatively intense amplitude and produces an M.M.F. in excess of the coercive force $Hc$ of the core 10. However, the interrogation pulse 24 does not actually produce any irreversible change in the remanent state of the core 10, as will appear more fully hereinafter. Upon termination of the interrogation pulse 24, the core 10 returns substantially to the same condition in the N state, if it was previously in the N state, and to the same condition in the P state, if it was previously in the P state.

Figure 3:
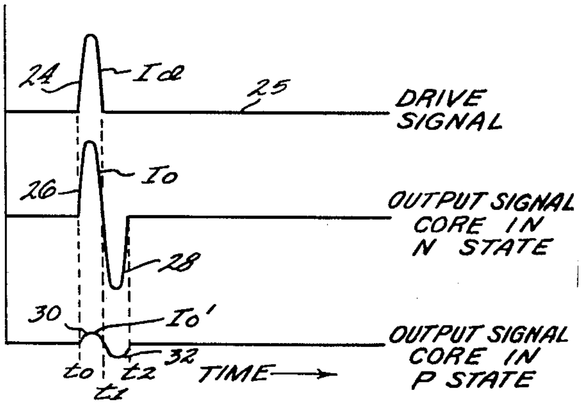
FIG. 3 is a graph of waveforms useful in explaining the operation of the system of FIG. 1.

The waveforms of FIG. 3 illustrate the output signals $Io$ and $Io'$ produced in the output winding 18 in response to an interrogation pulse 24 of waveform 25 when the core 10 is in the N and P states, respectively. It should be noted that the waveforms of FIG. 3 are illustrative for a particular core 10 only and may vary somewhat for other types of cores. However, the ratios of signals between the outputs I*o* and I*o'* for the two states permit easy detection of the state of a core constructed differently from those just described. The interrogation pulse 24 of the upper waveform 25 is applied to the interrogation winding 16 of the core 10 between the times *t*0 and *t*1.

When the core 10 is in the state N, a positive pulse 26 is produced in the output winding 18 between the times *t*0 and *t*1.

Following the positive pulse 26, a negative pulse 28, of near the same amplitude as the positive pulse 26, is induced in the output winding 18. The negative pulse 28 terminates at a time *t*2, which is later than the time *t*1, marking the termination of the interrogation pulse 24. However, when the core 10 is in the state P, a positive pulse 30 of amplitude small relative to the pulses 26 or 28, and a later, relatively small-amplitude, negative pulse 32 are produced in the output winding 18 between the times *t*0 and *t*2. The ratios between the peak amplitudes of corresponding positive and negative phases of the output signals I*o* and I*o'* are relatively large. A succession of the interrogation pulses 24 applied to the interrogation winding 16 produce a corresponding succession of either one of the output signals I*o* and I*o'* depending upon the initial state of the core 10. We have found that an indefinite number of interrogation pulses 24 can be applied, under certain conditions described more fully hereinafter, without changing the remanent state of the core 10. Thus, the information stored in the core 10 prior to the application of an interrogation pulse 24 is retained; that is, the information is read out non-destructively. The stored information may represent binary digits. For example, the state N may represent a binary "1" digit, and the state P may represent a binary "0" digit.

The mechanism that controls the response of the core 10 to the drive signals 24 is not fully understood. However, the following is a simplified explanation, according to one theory, of the response of the core 10 in producing relatively large output signals when in one state, and in producing relatively small output signals when in the other state. While the observed experimental results are substantially in accord with this theory, it is understood that the invention is not to be limited by the proposed theory of operation. It is believed, however, that the theory affords a basis for the construction of apparatus employing the invention.

According to the domain theory of ferromagnetism, a core of ferromagnetism material is subdivided into discrete domains each having a magnetization vector. When the core is in a remanent state, say the state N, substantially all the domain vectors are oriented in the same direction. A reversal in the magnetism of a core may be accomplished by the movement of the boundary surfaces of the domains called "domain walls" under the influence of the applied M.M.F. In the present invention, the cores may be made from rectangular hysteresis loop material, such as ultra-thin permalloy tape, so that the effects of eddy currents on the domain geometry and on domain wall movements are negligible. When the applied M.M.F. approaches a threshold value H*s*, near the knee of the hysteresis curve 20 of FIG. 2, a rapid increase occurs in the rate of change of magnetization with an increasing M.M.F. The sharp increase in the rate of change of magnetization is attributed to the formation of reversal domains around imperfections in the material, particularly around grain boundaries called "nucleation." The velocity of domain wall movements, due to the applied M.M.F., is limited by a so-called "damping factor." The reason for the presence of a damping factor is not pertinent here, but it appears to exist even in the absence of eddy currents. However, if the applied M.M.F. is removed before the reversal domains have reached a critical size, the reversal domains collapse upon themselves and the core returns to its initial remanent condition. Consequently, even when the applied M.M.F. exceeds the coercive force of the core, the changes in magnetization produced in the core are substantially "reversible" provided the M.M.F. is applied for a time less than that required for the reversal domains to reach the critical size.

A "reversible" change in magnetization is one such that the original condition is assumed by the magnetic material after removal of the unidirectional M.M.F. which initiated the change. Conversely, an "irreversible" change in magnetization is one such that the condition of the magnetic material is changed after removal of the unidirectional M.M.F. which initiated the change. To insure the absence of "irreversible" changes, a further limit on the applied M.M.F. and its time of application is provided by the elastic retaining forces acting on any domain walls that may exist prior to the application of the non-destructive read-out M.M.F. It is known that if existing domain walls are moved over a limited distance by the application of an applied M.M.F. which is either sufficiently weak, or which is applied for a sufficiently short time, they will return to their initial position after the termination of the applied M.M.F. For perfect, non-destructive read-out, therefore, the M.M.F. applied must be of such amplitude and duration that none of the existing domain walls are moved over distances exceeding their elastic limit.

A time interval is required between successive ones of the interrogation pulses 24 corresponding to the time required for the reversal domains to collapse upon themselves and for displaced domain walls to return to their position of equilibrium. This time interval may be of the same duration as the duration of an interrogation pulse 24. If a second interrogation pulse 24 were applied before this time interval had elapsed, cumulative magnetization changes occur, leading to partial or complete irreversible changes of magnetization.

The difference in the induced pulses when an interrogation pulse is applied to the core is due to the different magnetization changes under the two conditions. First, if the interrogation pulse tends to drive the core from remanence further into saturation in the same sense, in its initial direction of magnetization, the magnetization changes taking place during the application of the interrogation pulse are small and reversible. These changes in magnetization are believed due to domain-wall movement which is in a direction to reduce any reversal domains which may exist in the core when it is in its remanent state. These are few because of the nature of the material and its magnetic saturation in this direction. Second, if the interrogation pulse 24 is in a direction to change the remanent state of the core, then it is believed that a very large number of reversal domains are nucleated. Although none of these reversal domains reaches a critical size individually, their cumulative effect is substantially larger, in total flux change, than in the first case. Accordingly, a relatively larger output signal is obtained in the second case than in the first.

A process other than that of domain nucleation which may contribute to the reversible magnetization changes occurring during non-destructive read-out by short pulses, is that of "spin rotation"; i.e., the coherent rotation over a small angle of the magnetization of a whole domain. Rotation of this type is known to be reversible up to a certain critical angle. Once this angle is exceeded, the whole magnetization domain rotates abruptly into a direction parallel to the applied M.M.F.

It is likely that both domain nucleation and spin rotation contribute to the reversible magnetization changes taking place during non-destructive read-out by means of relatively intense and relatively short-duration pulses. The limit on the pulse height-duration product probably is set by the distance over which domain walls, existing before the application of the pulse, can be moved elastically.

In one specific illustrative embodiment of the invention, a core 10 of 4–79 Molybdenum-Permalloy having five wraps each of ⅛ thousandth of an inch thick was used. The interrogation winding 16 was provided with five turns. The coercive force for this core was approximately equal to 13 milliampere turns. Interrogation pulses 24 of $\frac{1}{10}$ microsecond duration and having 80 milliamperes peak value were applied to the interrogation winding 16. Thus, the M.M.F. produced by each interrogation pulse 24 was approximately thirty times $$\left(\frac{5\times 80}{13}=30.8\right)$$

greater than the coercive force of the core 10. The positive phase I*o* of the output signal 26 was approximately 1.0 volt peak value, and the negative phase 28 of the output signal I*o* was approximately 1.0 volt peak value. The positive phase I*o'* of the output signal 30 was approximately 0.4 volt peak value, and the negative phase 32 of the output signal I*o'* was approximately 0.4 volt peak value. The source for supplying the interrogation signals 24 was operated at a repetition rate above 1 megacycle per second. An indefinite number (in excess of a million) of read-out signals were obtained without changing the initail remanent state of the core.

In any particular instance, suitable parameters of the interrogation signal, such as amplitude, duration, and spacing, can be determined by a simple test. The interrogation signal source is operated to apply a train of interrogation signals 24 to the core 10 when it is in one state, say the state N, in a sense to drive the core toward the other state P. After the train of such pulses is terminated, the output induced in the output winding 18, when a setting current I*s* again is applied to the setting winding 12, is observed. The absence of any observed, substantial output indicates that the parameters of the interrogation signals are suitable. If an output comparable in amplitude to that derived when the core is driven from one state to another is obtained, then the pulse preferably should be made shorter in duration.

Figure 4:
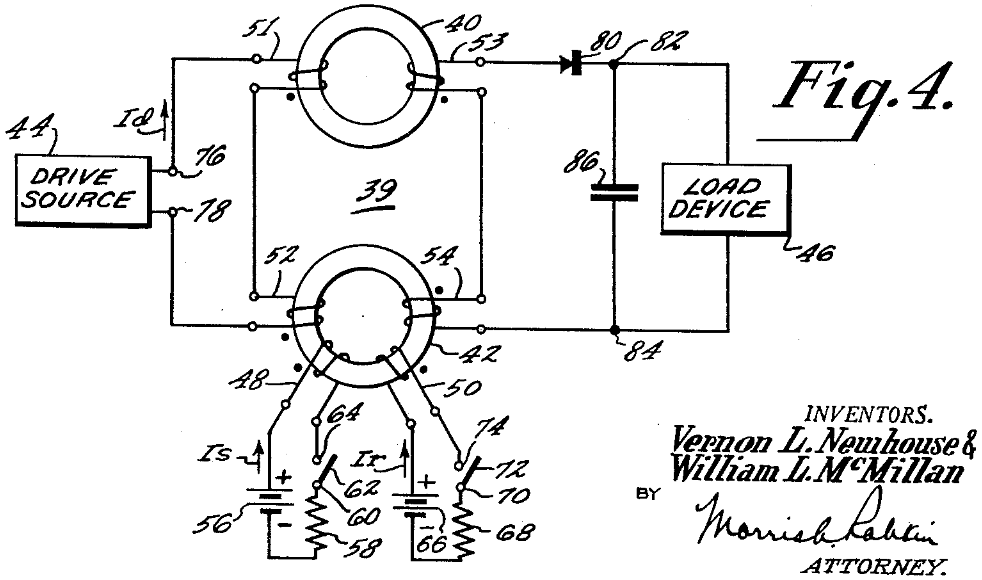
FIG. 4 is a schematic diagram of a magnetic amplifying circuit according to the invention.

FIG. 4 shows a magnetic amplifier circuit 39 according to the present invention. In the circuit of FIG. 4, a relatively small energy level input signal controls an indefinitely large number of output signals. The amplifier 39 has two cores 40 and 42, each similar to the core 10 of FIG. 1. The upper core 40 is used as a "bucking" core and is intially placed in the P state. For example, a reset winding, not shown, may be linked temporarily to the core 40. A reset pulse applied to the temporary reset winding places the core 40 in the state P. The temporary reset winding, then, may be removed from the core 40. The lower core 42 is used to control the transmission of electric power from a source 44 to a load device 46. A setting winding 48, a reset winding 50, a drive winding 52, and an output winding 54 are each linked to the control core 42. The marked terminal of the setting winding 48 of the control core 42 is connected to the positive terminal of a setting source such as a battery 56. The negative terminal of the battery 56 is connected in series with a resistor 58 to the movable terminal 60 of a single-pole, single-throw, setting switch 62. The other, fixed terminal 64 of the switch 62 is connected to the unmarked terminal of the setting winding 48. The unmarked terminal of the reset winding 50 of the control core 42 is connected to the positive terminal of a reset source, for example, a battery. The negative terminal of the battery is connected in series with a resistor 68 to the movable terminal 70 of a single-pole, single-throw, reset switch 72. The other, fixed terminal 74 of the switch 72 is connected to the marked terminal of the reset winding 50.

The bucking core 40 is provided with a drive winding 51 and an output winding 53. The drive windings 51 and 52 of the cores 40 and 42 are connected in series-aiding relationship with each other by connecting the marked terminal of the drive winding 51 to the unmarked terminal of the drive winding 52. The unmarked terminal of the drive winding 51 is connected to one output terminal 76 of the drive source 44, and the marked terminal of the drive winding 52 is connected to another output terminal 78 of the drive source 44. The output windings 53 and 54 of the two cores are connected in series-opposition relationship with each other by connecting the marked terminal of the output winding 53 of the bucking core 40 to the marked terminal of the output winding 54 of the control core 42. The unmarked terminal of the output winding 53 of the bucking core 40 may be connected in series with a unilateral conducting device such as a crystal diode 80. The diode 80 is poled for easy current flow to pass positive current (conventional flow) from the unmarked terminal of the output winding 53 to a junction 82. The unmarked terminal of the output winding 54 of the control core 42 is connected to a second junction 84. A linear filter capacitor 86 is connected in parallel with a load device 46 across the two junctions 82 and 84.

Figure 5:
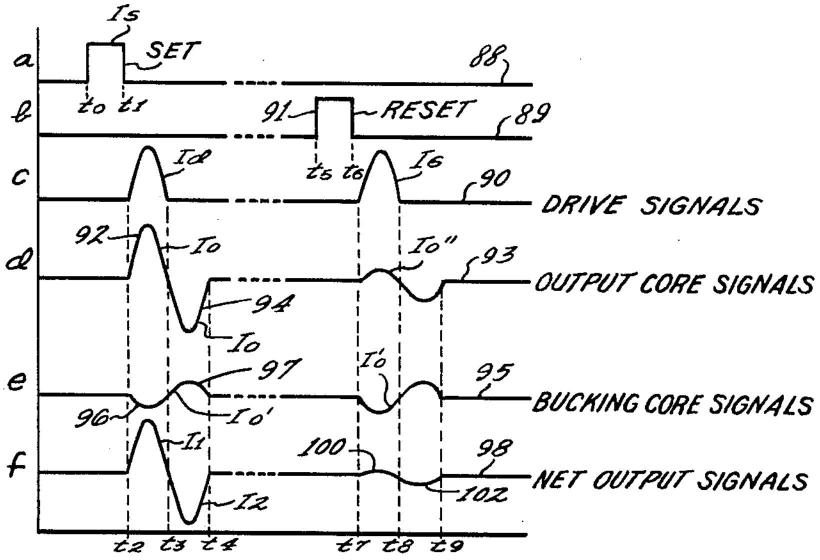
FIG. 5 is a graph of waveforms useful in explaining the operation of the circuit of FIG. 4.

In operation, the control core 42 is placed in the state N by momentarily closing, and then opening, the setting switch 62 to cause a setting current pulse I*s* to flow into the marked terminal of the setting winding 48. In FIG. 5, the waveform of the setting pulse I*s*, illustrated in the first line *a*, is applied to the control core 42 between the times *t*0 and *t*1. A subsequent drive signal I*d*, illustrated in line *c* of FIG. 5, is applied to the drive windings 51 and 52 between the times *t*2 and *t*3. Between the time *t*2 and a later time *t*3, the positive phase 92 of the output signal I*o* is produced in the output winding 54 of the control core 42, as illustrated in the line *d* of FIG. 5; and the negative phase 96 of the output signal I*o'* is produced in the output winding 53 of the bucking core 40, as illustrated in line *e* of FIG. 5. In practice, for cores constructed differently from the cores 40 and 42, the positive phase 92 of the output signal I*o* and the negative phase 96 of the output signal I*o'* may terminate at a time later than the time *t*3. The output signals I*o* and I*o'* are 180° out of phase with each other because of the series-opposition connection of the output windings 53 and 54. The resulting positive output signal I1, illustrated in line *f* of FIG. 5 and equal to the algebraic sum of the output signals I*o* and I*o'*, is produced between the times *t*2 and *t*3. A resultant positive output current flows to the load device 46. The negative phase 94 of the output signal I*o* and the positive phase 97 of the output signal I*o'* are produced in the output windings 53 and 54 between the times *t*3 and *t*4. A resultant output signal I2, shown in line *f* of FIG. 5, is produced between the times *t*3 and *t*4. However, substantially no current flow is produced in the output windings 53 and 54 and their connected circuits between the times *t*3 and *t*4 because the diode 80 is poled to block current flow from the unmarked terminal of the output winding 54 of the control core 42. A succession of drive signals I*d* produce a succession of unidirectional output currents which flow into the load device 46. A D.C. (direct current) voltage output can be obtained by using a sufficiently large capacitor as the load device 46.

The control core 42 can be changed to its reset condition by momentarily closing, and then opening, the reset switch 72 to produce a reset current I*r* which flows into the unmarked terminal of the reset winding 50. A reset pulse 91, as illustrated in line *b* of FIG. 5, is applied to the reset winding 50 between the times *t*5 and *t*6.

A subsequent drive signal I*d* applied to the drive windings 51 and 52 between the times *t*7 and *t*8 produces substantially equal amplitude and opposite-polarity output signals I*o''* and I*o'* in the output windings 54 and 53, respectively. Between the times *t*7 and *t*8, the output signals I*o''* and I*o'* have positive and negative phases respectively, as illustrated in lines *d* and *e* of FIG. 5. Between the time *t*8 and a later time *t*9, the output signals $Io''$ and $Io'$ have negative and positive phases respectively. These two output signals $Io''$ and $Io'$ effectively cancel each other, as illustrated in line *f* of FIG. 5, by the relatively small output signal 100.

Accordingly, by selectively establishing the control core 42 in the state N or the state P, the amount of power transferred to the load device 46 is controlled. The parallel capacitor 86 serves as a conventional filter capacitor to smooth the rectified power supplied to the load device 46. However, if desired, the circuit of FIG. 4 can be used to supply alternating power to the load device 46 by removing the diode 80 and the filter capacitor 86. For example, a load device 46 may be a heating element or a conventional light bulb which operates on alternating power input.

Figure 6:
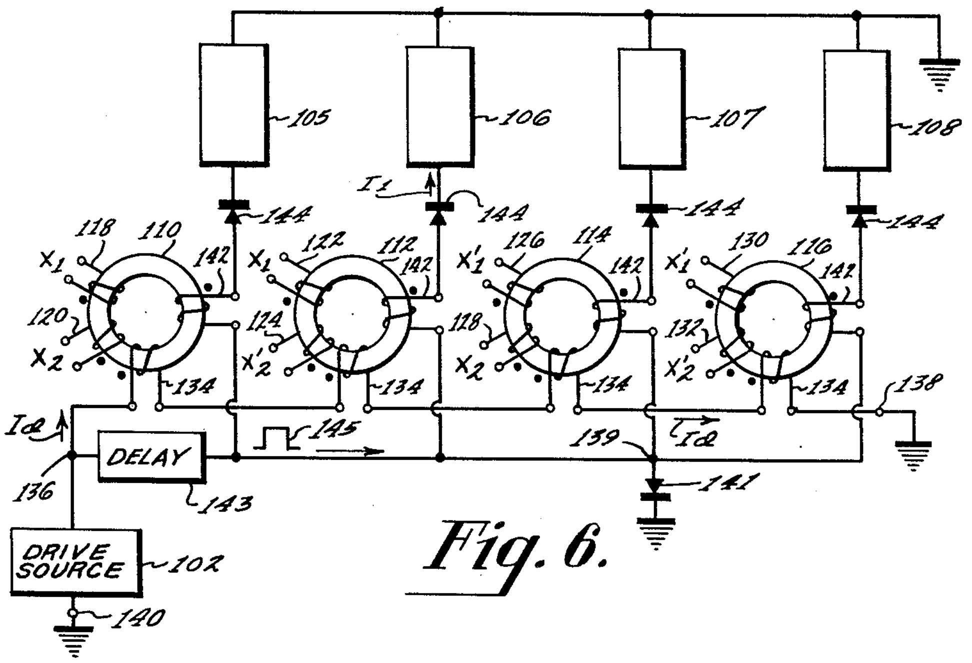
FIG. 6 is a schematic diagram of a switching circuit according to the invention.

In the switching circuit of FIG. 6, energy from a drive source 102 is selectively applied to one of four separate load devices 105, 106, 107 and 108 in accordance with two binary input signals. Each binary input signal $X_1$, $X_2$, represents a binary "1" and each binary input signal $X_1'$, $X_2'$, represents a binary "0." When $X_1$ is present, $X_1'$ is absent and vice versa; similarly, when $X_2$ is present, $X_1'$ is absent and vice versa. Therefore, $X_1$ and $X_1'$ represent respectively a binary digit and its complement; $X_2$ and $X_2'$ represent another binary digit and its complement. First setting windings 118, 122, 126 and 130 are provided respectively for cores 110, 112, 114 and 116. Second setting windings 120, 124, 128 and 132 are provided respectively for cores 110, 112, 114 and 116. Signal $X_1$ is applied to first windings 118 and 122 of a pair of cores 110 and 112. Signal $X_1'$ is applied to first windings 126 and 130 of another pair of cores 114 and 116; signal $X_2$ is applied to second setting windings 120 and 128 of alternate cores 110 and 114; and signal $X_2'$ is applied to second setting windings 124 and 132 of other alternate cores 112 and 116.

Drive windings 134 are linked to each of the cores 110, 112, 114 and 116. The drive windings 134 are connected in series-aiding relationship with each other between a first junction 136 and a second junction 138 by connecting the unmarked terminal of one drive winding 134 to the marked terminal of a succeeding drive winding 134. The marked terminal of the drive winding 134 of the first core 110 is connected to the first junction 136, and the unmarked terminal of the drive winding 134 of the last core 116 is connected to the second junction 138. The first junction 136 is connected to one output of a drive source 102 which has a second output 140 connected to the common ground. Individual output windings 142 respectively link the cores 110, 112, 114 and 116. The marked terminals of each output winding 142 is connected in series with a separate unilateral conducting device, such as a crystal diode 144, to a respective one of the load devices 105, 106, 107 and 108. The diodes 144 are each poled to pass current in the direction of easy current flow from the marked terminal of an output winding 142, in the conventional sense, to ground. The unmarked terminals of all the output windings 142 are connected in parallel to a third junction 139. The third junction 139 is connected to ground by a common unilateral conducting device, such as a crystal diode, 141 poled to pass current, in the direction of easy current flow, from the junction 139 to ground. The load devices 105, 106, 107 and 108 are all connected at their extreme terminals to ground. A delay unit 143 connects the output terminal 136 of the drive source 102 to the third junction 139. The delay unit 143 may be a conventional L-C delay circuit terminated, for example, by a resistance element equal to the characteristic impedance of the delay circuit. A reset winding which, for convenience, is not shown, is linked to each of the cores 110, 114 and 116 in the manner described for the core 42 of FIG. 4.

In operation, each of the cores 110, 112, 114 and 116 is initially placed in its state P, as described for the core 42 of FIG. 4. A desired one of the cores is changed to its state N by applying concurrently setting signals to the two setting windings of that core. For example, the core 112 is changed to its state N by applying setting signals $X_1$ and $X_2'$ to its setting windings 122 and 124. No current flow is produced during the setting operation because of the diode 144 which blocks current flow from the unmarked terminal of the output winding 142 of the core 112.

When a subsequent drive signal $Id$ is applied by the drive source 102, a relatively large output voltage is induced across the terminals of the output winding 142 of the core 112. The drive signal flows through all the drive windings 134 and out of the terminal 138 to ground. The induced output voltage is in the direction to make the marked terminal of the core 112 output winding 142 positive relative to its unmarked terminal. Accordingly, the output voltage of the core 112 is in a direction to make the diode 144 between the core 112, output winding 142, and the load device 106, conduct. The core 112 output voltage also is in a direction to drive the common diode 141 to its cut-off condition and each of the other three diodes 144 into their cut-off condition. The relatively small, positive output voltage developed in each of the output windings of the three initially reset cores 110, 114 and 116 by the drive signal $Id$ is insufficient to make any of their respective diodes 144 conduct. The drive signal $Id$ also is applied to the delay unit 143, and, after a suitable delay, is applied as a current pulse 145 to the third junction 139. The current pulse 145 flows from the delay circuit 143, through the output winding 142 of the desired core 112, then through the corresponding diode 144, and then through the load device 106 to ground. After the drive signal $Id$ is terminated, the common diode 141 becomes conductive and bypasses any remaining positive portion of the current pulse 145 from the load devices 105—108. The following negative phase of the output signal from the core 112 is blocked by the diode 144 connected to the core 112 output winding 142.

A succession of the drive signals $Id$ furnish a correspond succession of outputs to the selected load 106. Any other of the cores 110, 112, 114 and 116 can be selected in similar manner by resetting the core 112 and supplying the corresponding pair of setting signals to the setting windings of such other core.

Figures 7, 8:
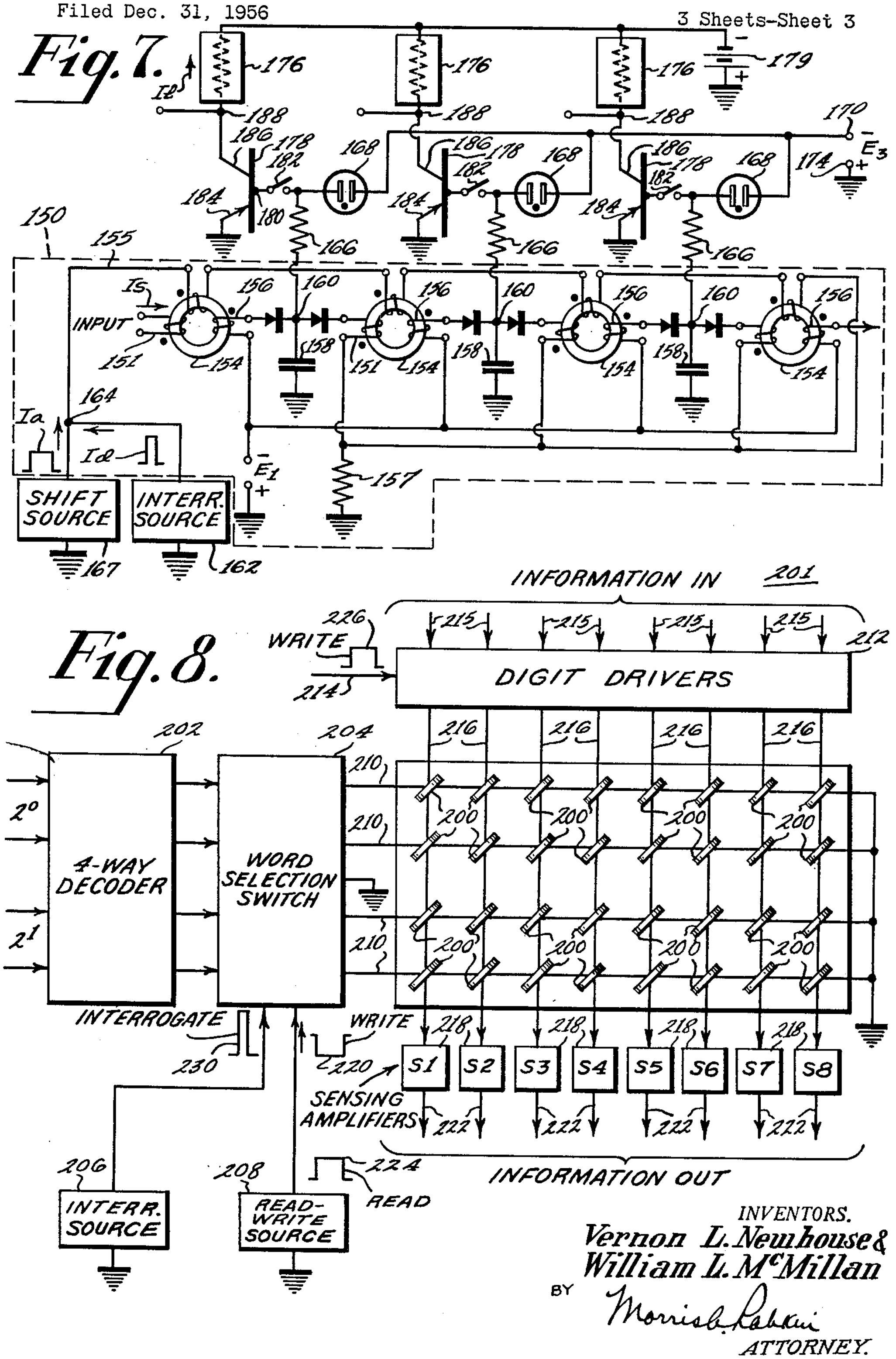
FIG. 7 is a schematic diagram of a magnetic shift register according to the invention.
FIG. 8 is a schematic diagram of a random access memory according to the invention.

In FIG. 7, a shift register circuit is shown which provides, non-destructively, a visual indication of the stored information. The shift register circuit enclosed by the dotted block 150 is similar to the shift register device described in the IRE Transactions on Electronic Computers, vol. EC–5, No. 3, September 1956, by V. L. Newhouse and N. S. Prywes, entitled "High-Speed Shift Registers Using One Core Per Bit."

In the shift register of FIG. 7, the output winding 156 of one core is connected in series with the input winding 151 of a succeeding core 154 by a pair of diode rectifier elements. Each of the diode rectifier elements is poled for easy current flow, in the positive conventional direction, from the marked terminal of an output winding 156 to the unmarked terminal of a succeeding input winding 151. A shift line 155 links all the cores 154. The marked terminals of all the input windings 151, except that of the first core 154, are connected to ground by a series resistor 157. The shift line 155 also is connected to ground at one end through the series resistor 157. The unmarked terminals of all the output windings 156 are connected to the negative terminal of a bias source E1 which has its positive terminal connected to ground. The other end of the shift line 155 is connected to a common junction 164. An interrogation (Interr.) source 162, and a shift source 167 each have one output connected to the common junction 164, and each have another output connected to ground. A separate, temporary storage capacitor 158 is provided between each pair of cores 154. Each capacitor 158 has one plate connected to a different junction 160 between each different pair of diode rectifiers, and has the other plate connected to ground.

A different series resistor 166 connects a different one of the junctions 160 to one electrode of a different indicating device 168, such as a neon lamp. All the neon lamps are then connected at their other electrodes to the negative terminal 170 of a bias source $E_3$. The positive terminal of the bias source $E_3$ is connected to ground. The source $E_3$ potential difference is regulated such that each of the neon lamps is maintained slightly below its ignition potential.

An arbitrary pattern of information may be read into the shift register 150 by alternatingly applying input signals $Is$ to the input winding 151 of the first core 154 and shift signals $Ia$ to the shift line 155. The shifting operation is described in detail in the aforementioned Newhouse and Prywes article. During a shift operation, the transfer circuit capacitors 158 are charged to a relatively high potential when the cores 154 are storing binary "1" digits. This high potential is sufficient both to ignite the neon indicator 168 and to force transfer currents through the input windings 151 and the bias resistor 157. The current flow in the input windings 151 changes the remanent states of the succeeding cores 151. Substantially no output signal is produced by the cores 154 that are storing binary "0" digits.

The stored pattern of information may be observed by operating the interrogation source 162 to apply an interrogation signal $Id$ to the shift line 155. Each interrogation signal $Id$ is of relatively large amplitude and relatively short duration, as described above. Therefore, only reversible magnetization changes are produced in the cores 154 during the interrogation operation. The output signals produced in the output windings 156 during the interrogation operation are representative of the information stored in the respective cores 154. If a core 154, for example, is storing a binary "1" digit, represented by one state, a relatively large output signal is produced in its output winding 156. This large output signal is sufficient to increase the potential difference across the neon lamp associated with that stage to ignite that lamp. Note, however, that the interrogation signal charges the transfer circuit capacitor 158 to a lower potential than that produced by a shift signal. Therefore, the bias resistor 157 limits the current flow in the input windings 151 during an interrogation operation. This limited current flow is insufficient to change the remanent states of the succeeding cores 154. If a core 154 is storing a binary "0" digit represented by the other state, a relatively small output signal is induced in its output windings 156. This relatively small output signal is insufficient to ignite the neon lamp associated with that stage. The group of neon indicators 168 then provide a visual indication of the information stored in the register 150. The negative phases of the output signals induced in the output windings 156 of the cores 154 by the interrogation signal $Id$ are blocked by the diodes connected between the output windings 156 and the junctions 160. As many interrogation signals $Id$ as desired may be applied without destroying the stored information and without shifting the pattern of the stored information signals.

The stored information also may be used for controlling the repeated application of output signals to separate load devices 176 without changing the information stored in the shift register 150. A separate amplifying device, such as a PNP conductivity-type transistor 178, may be used for providing amplified signals to each separate load device 176. The base electrodes 180 of the transistors 178 may be connected to the respective movable arms of single-pole, single-throw switches 182. The fixed terminals of the switches 182 are connected respectively through the resistors 166 to the separate junctions 160. The emitter electrodes 184 of all the transistors 178 are connected to ground. The collector electrode 186 of each of the transistors 178 may be connected to a different output junction 188. Each separate one of the load devices 176 has one terminal connected to a different one of the output junctions 188. All the other output terminals of the load devices 176 are connected to the negative terminal of a bias source 179 which has its positive terminal connected to ground. The bias source 179 maintains each of the transistors 178 in its cut-off condition.

In operation, when the single-pole switches 182 are closed, an interrogation signal $Id$ applied to the junction 164 produces a relatively large, positive voltage in the output winding 156 of each core 154 storing a binary "1" digit, and a relatively small voltage in the output winding 156 of a core 154 storing a binary "0" digit. The output signals are applied to the base electrodes 180 of the respective transistors 178 via the series resistors 166. Those of the transistors 178 which have a relatively large output signal applied to their base electrodes 180 are changed to their conductive condition. A relatively large current flows from ground through the emitter-to-collector path of the conducting transistors 178, and then through their connected load devices 176 to the source 179. Those of the transistors 178 which have a relatively small, positive voltage applied to their base electrodes remain non-conductive. Thus, substantially no current flows in the emitter-to-collector paths of the non-conductive ones of the transistors 178. Accordingly, only those of the load devices 176 that correspond to the cores 154 that are storing a binary "1" digit receive a relatively large signal applied thereto. The remaining load devices 176 that correspond to cores 154 storing a binary "0" have substantially no signals applied thereto. As many interrogation signals $Id$ as desired may be applied without destroying the information initially stored in the shift register 150. If desired, the respective output signals may be taken between the respective output junctions 188 and ground.

A random access memory 201 embodying the present invention is illustrated in FIG. 8. In the memory 201, each row of eight cores 200 stores a different binary character (word) comprising eight binary digits. A character is written into, and read out of, the array in parallel under the control of signals representing two binary digits of order $2^0$ and $2^1$. These signals representing the binary digits of order $2^0$ and $2^1$ are used to control a four-way decoder unit 202. The decoder 202 may be any suitable crystal-diode decoder unit. The four separate outputs of the decoder 202 respectively enable a different one of four separate row driver gates (not shown) which are a part of a word-selection switch 204. Each driver gate may comprise a two-input "and" gate circuit. A first of the inputs of the driver gates are controlled respectively by the four outputs of the decoder 202. The second inputs of all the driver gates are controlled by either one of two inputs; namely, an interrogation input and a write input. The interrogation input of the selection switch 204 is connected to an interrogation pulse source 206. The write input of the selection switch 204 is connected to a write source 208. The four outputs of the selection switch 204 are connected respectively to a different one of four row windings 210 each linked to the eight cores of a respective row of the cores 200. After linking all the cores 200 in a row, each row winding 210 is connected to ground. Entry of the separate binary digits of a character are controlled by a digit driver circuit 212. The digit driver circuit 212 may include eight separate two-input "and" gates (not shown). A first input of all the digit "and" gates is connected to a write input 214. The second inputs of respective "and" gates are connected to respective ones of eight digit lines 215. The outputs of the eight "and" gates of the digit driver 212 are each connected to a different one of eight column windings 216. Each column winding 216 links the four cores 200 of a different column. Each column winding 216 is connected to one input of a different one of eight sensing amplifiers 218 designated as S1 through S8, respectively. Each of the sensing amplifiers 218 is arranged to provide a relatively high-impedance during a write operation and a relatively low-impedance during an interrogation operation.

In operation, a desired one of the rows of cores 200 is selected by applying the set of binary inputs $2^0$—$2^1$ designating the desired row. The "and" gate (not shown) of the word-selection switch 204 connected to the row winding 210 of the desired row is thereby enabled.

The reading of information out of, and the writing of information into, a desired row of the memory cores 100 may be carried out in known fashion. Thus, during the read operation, a positive read pulse 224 is applied to the word selection switch 204. The enabled "and" gate of the selection switch 204 passes the positive pulse to the row winding 210 of the desired row of cores 200. The resultant output signals induced in the respective column windings 216 are applied to the respective sensing amplifiers S1–S8 as an indication of the stored information.

During the writing operation, a negative write pulse 220 is applied to the word selection switch 204, and a positive write pulse 226 is applied to the digit drivers 212. The enabled "and" gate of the word selection switch passes the negative write pulse 220 to the column winding 210 of the desired row of cores 200. At the same time, positive signals, representing the information to be written into desired ones of the cores 200, are applied to respective ones of the digit lines 215 and are passed by the respective ones of the "and" gates of the digit drivers 212 to the respective column windings 216. Coincidence of the signals on the row and column windings 210 and 216 of a core 200 maintain that core 200 in its initial state. However, a core 200 receiving only a write pulse is changed from its initial to its other remanent state.

The information stored in any desired row of cores 200 can be ascertained without changing the states of the cores 200 of that row, in accordance with the invention, by applying a positive interrogation pulse 230 to the word selection switch 204. The interrogation pulse 230 is passed by the enabled "and" gate of the word selection switch 204 to the column winding 210 of the desired row of cores 200.

The advantages of such a non-destructive read-out in a random access memory system 200 include the fact that the stored information can be ascertained in a single, relatively high-speed operation. Accordingly, the effective access time of the memory decreases by a factor which depends upon the proportion of memory interrogations to memory entries. For example, in an extreme case where the memory is used only for reference to previously stored information, the access time simply comprises the time for selecting a desired row and then supplying an interrogation pulse 230 to that row.

There have been described herein improved electrical circuits using magnetic elements wherein a plurality of successive useful outputs can be obtained without changing the initial states of the elements. Relatively large-amplitude, short-duration signals are used for obtaining the useful outputs. The present invention may be used, for example, in magnetic amplifier circuits, magnetic switching circuits, and magnetic storage circuits.

What is claimed is:

1. The combination of an element of substantially rectangular hysteresis loop magnetic material having two remanent states, a first winding means linked to said element, means for applying to said first winding means an interrogation pulse, said interrogation pulse having such an amplitude as to generate a magnetizing force in excess of the coercive force of said element and having an insufficient time duration to effect a change in the remanent condition of said element, and a second winding means linked to said element, said second winding means having a signal of either one or the other of two different amplitudes produced therein in accordance with whether said element is in the one or the other of said remanent states when said interrogation pulse is applied.

2. The combination as claimed in claim 1, including means for selectively establishing said element in either the one or the other of said remanent states.

3. The combination as claimed in claim 1, including a third winding means linked to said element for setting said element to one of said states, and a fourth winding means linked to said element for resetting said element to the other of said states.

4. The combination of a magnetic element of substantially rectangular hysteresis loop material having two remanent states, winding means on said element, and pulse-generating means operatively connected to said winding means to apply to said winding means a current pulse, said pulse having such an amplitude as to generate a magnetizing force in excess of the coercive force of said element and having an insufficient time duration to effect a change in the remanent condition of said element to induce in said winding means a voltage controlled by the magnetization changes produced in said element by said applied pulse.

5. In a magnetic circuit, the combination comprising two elements of substantially rectangular hysteresis loop material, each said element having two remanent states, separate first winding means, each linked to a different one of said elements, means for applying to each said first winding means a current pulse having such an amplitude as to generate a magnetizing force in excess of the coercive force of said elements and having an insufficient time duration to effect a change in the remanent conditions of said elements, and second winding means linking both said elements, said second winding means having a signal of either one or the other of two different amplitudes produced therein in accordance with whether said elements are in one or the other of said remanent states when said current pulse is applied.

6. In a magnetic circuit, the combination as claimed in claim 5, including means for selectively establishing one of said elements in either the one or the other of said remanent states.

7. In a magnetic system having a plurality of magnetic elements of rectangular hysteresis loop material, each of said elements having two remanent states, and having means for setting said elements in desired ones of said states, the combination of means for determining the states of said elements comprising separate winding means linked to separate ones of said elements, means for applying to said elements a unidirectional magnetizing force in excess of the coercive force of said elements and of a duration insufficient to effect a change in the remanent conditions of said elements, and separate output means, each responsive to signals produced in a different one of said winding means when said magnetizing force is applied.

8. In a magnetic memory having a plurality of magnetic cores of substantially rectangular hysteresis loop material arranged in coordinate groupings and having separate coordinate lines for selectively writing information into any desired one of said elements by changing said desired element to either the one or the other of said remanent states, the combination of means for determining the information written into said desired element comprising means for applying to one coordinate line linking said desired element, an interrogation pulse having such an amplitude as to generate a magnetizing force in excess of the coercive force of said elements and having an insufficient time duration to effect a change in the remanent conditions of said elements, whereby another coordinate line linking said desired element has a signal produced therein in accordance with whether said desired element is in the one or the other of said remanent states when said interrogation pulse is applied.

9. In a magnetic memory system having: a plurality of magnetic cores arranged in rows and columns, each of said cores having two remanent states; a plurality of row windings each linking a different row of said cores; a plurality of column windings each linking a different column of said cores, and having means for writing information into any selected row of said cores, the combination of means for detemining the information written into any desired row of said cores comprising means for applying to said row winding linking said desired row an interrogation pulse having such an amplitude as to generate a mganetizing force in excess of the coercive force of said cores of said desired row and having a time duration insufficient to change the remanent condition of any of said cores of said desired row, whereby any core of said desired row produces in the column winding linked thereto a signal of either one or the other of two different amplitudes in accordance with the state of that core when said interrogation pulse is applied.

References Cited in the file of this patent

UNITED STATES PATENTS

| | | |
|---|---|---|
| 2,164,383 | Burton | July 4, 1939 |
| 2,734,182 | Rajchman | Feb. 7, 1956 |
| 2,734,184 | Rajchman | Feb. 7, 1956 |
| 2,766,388 | Wulfing | Oct. 9, 1956 |
| 2,768,312 | Goodale et al. | Oct. 23, 1956 |
| 2,803,812 | Rajchman et al. | Aug. 20, 1957 |
| 2,805,409 | Mader | Sept. 3, 1957 |
| 2,808,578 | Goodell et al. | Oct. 1, 1957 |
| 2,843,838 | Abbott | July 15, 1958 |

FOREIGN PATENTS

| | | |
|---|---|---|
| 761,131 | Great Britain | Nov. 14, 1956 |
| 766,037 | Great Britain | Jan. 16, 1957 |

OTHER REFERENCES

"A New Nondestructive Read for Magnetic Cores," from 1955 Western Joint Computor Conference, published August 1955, pp. 111–116, 44B.

Basics of Digital Computers, vol. 2, by John S. Murphy, page 99, published 1958.

UNITED STATES PATENT OFFICE

CERTIFICATE OF CORRECTION

Patent No. 3,049,695 August 14, 1962

Vernon L. Newhouse et al.

It is hereby certified that error appears in the above numbered patent requiring correction and that the said Letters Patent should read as corrected below.

In the grant, lines 1 and 2, for "Vernon L. Newhouse, of Haddonfield, and William L. McMillan, of Little Rock, New Jersey" read -- Vernon L. Newhouse, of Haddonfield, New Jersey, and William L. McMillan, of Little Rock, Arkansas --; in the heading to the printed specification, lines 3 and 4, for "Vernon L. Newhouse, Haddonfield, and William L. McMillan, Little Rock, N. J." read -- Vernon L. Newhouse, Haddonfield, N. J., and William L. McMillan, Little Rock, Ark. --; column 3, line 51, for "ferromagnetism" read -- ferromagnetic --.

Signed and sealed this 1st day of January 1963.

(SEAL)
Attest:

ERNEST W. SWIDER
Attesting Officer

DAVID L. LADD
Commissioner of Patents